(12) United States Patent
Crabtree et al.

(10) Patent No.: US 12,058,178 B2
(45) Date of Patent: Aug. 6, 2024

(54) PRIVILEGE ASSURANCE OF ENTERPRISE COMPUTER NETWORK ENVIRONMENTS USING LOGON SESSION TRACKING AND LOGGING

(71) Applicant: QOMPLX LLC, Reston, VA (US)

(72) Inventors: Jason Crabtree, Vienna, VA (US); Andrew Sellers, Monument, CO (US); Richard Kelley, Woodbridge, VA (US)

(73) Assignee: QOMPLX LLC, Reston, VA (US)

(*) Notice: Subject to any disclaimer, the term of this patent is extended or adjusted under 35 U.S.C. 154(b) by 674 days.

(21) Appl. No.: 17/330,893

(22) Filed: May 26, 2021

(65) Prior Publication Data

US 2021/0409449 A1 Dec. 30, 2021

Related U.S. Application Data

(63) Continuation-in-part of application No. 17/008,276, filed on Aug. 31, 2020, now Pat. No. 11,323,484, (Continued)

(51) Int. Cl.
*H04L 9/40* (2022.01)
*G06F 16/2458* (2019.01)
*G06F 16/951* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS

| 5,669,000 A | 9/1997 | Jessen et al. |
| 6,256,544 B1 | 7/2001 | Weissinger |

(Continued)

FOREIGN PATENT DOCUMENTS

| CN | 105302532 B | 6/2018 |
| WO | 2014159150 A1 | 10/2014 |
| WO | 2017075543 A1 | 5/2017 |

OTHER PUBLICATIONS

16. Phillips C, Swiler LP. A graph-based system for network-vulnerability analysis. In Proceedings of the 1998 workshop on New security paradigms Jan. 1, 1998 (pp. 71-79) (Year: 1998).*

*Primary Examiner* — Catherine Thiaw
(74) *Attorney, Agent, or Firm* — Galvin Patent Law LLC; Brian R. Galvin

(57) ABSTRACT

A system and method for the prevention, mitigation, and detection of cyberattack attacks on computer networks using logon session tracking and logging. The system uses local session monitors to monitor logon sessions within a network, track session details, and generate an event log for any suspicious sessions or details. Cyber-physical graphs and histograms using persisted time-series data provides critical information, patterns, and alerts about configurations, attack vectors, and vulnerabilities which enable information technology and cybersecurity professionals greater leverage and control over their infrastructure.

10 Claims, 14 Drawing Sheets

Related U.S. Application Data which is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823,285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, and a continuation-in-part of application No. 15/616,427, filed on Jun. 7, 2017, now abandoned, which is a continuation-in-part of application No. 14/925,974, filed on Oct. 28, 2015, now abandoned, said application No. 15/887,496 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 16/855,724 is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, which is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, and a continuation-in-part of application No. 15/616,427, filed on Jun. 7, 2017, now abandoned, and a continuation-in-part of application No. 15/141,752, filed on Apr. 28, 2016, now Pat. No. 10,860,962, said application No. 15/849,901 is a continuation-in-part of application No. 15/835,312, filed on Dec. 7, 2017, now Pat. No. 11,055,451, which is a continuation-in-part of application No. 15/186,453, filed on Jun. 18, 2016, now abandoned, said application No. 16/248,133 is a continuation-in-part of application No. 15/813,097, filed on Nov. 14, 2017, now abandoned, which is a continuation-in-part of application No. 15/616,427, filed on Jun. 7, 2017, now abandoned, said application No. 16/248,133 is a continuation-in-part of application No. 15/806,697, filed on Nov. 8, 2017, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, said application No. 15/806,697 is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, said application No. 16/248,133 is a continuation-in-part of application No. 15/673,368, filed on Aug. 9, 2017, now abandoned, which is a continuation-in-part of application No. 15/376,657, filed on Dec. 13, 2016, now Pat. No. 10,402,906.

(60) Provisional application No. 62/568,312, filed on Oct. 4, 2017, provisional application No. 62/568,305, filed on Oct. 4, 2017, provisional application No. 62/568,307, filed on Oct. 4, 2017, provisional application No. 62/568,291, filed on Oct. 4, 2017, provisional application No. 62/568,298, filed on Oct. 4, 2017.

(56) References Cited

U.S. PATENT DOCUMENTS

| | | |
|---|---|---|
| 6,477,572 B1 | 11/2002 | Elderton et al. |
| 7,072,863 B1 | 7/2006 | Phillips et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |

(56) References Cited

U.S. PATENT DOCUMENTS

| | | | |
|---|---|---|---|
| 9,231,962 B1 | 1/2016 | Yen et al. | |
| 9,602,530 B2 | 3/2017 | Ellis et al. | |
| 9,654,495 B2 | 5/2017 | Hubbard et al. | |
| 9,672,355 B2 | 6/2017 | Titonis et al. | |
| 9,686,308 B1 | 6/2017 | Srivastava | |
| 9,762,443 B2 | 9/2017 | Dickey | |
| 9,887,933 B2 | 2/2018 | Lawrence, III | |
| 9,946,517 B2 | 4/2018 | Talby et al. | |
| 10,061,635 B2 | 8/2018 | Ellwein | |
| 10,102,480 B2 | 10/2018 | Dirac et al. | |
| 10,210,246 B2 | 2/2019 | Stojanovic et al. | |
| 10,210,255 B2 | 2/2019 | Crabtree et al. | |
| 10,242,406 B2 | 3/2019 | Kumar et al. | |
| 10,248,910 B2 | 4/2019 | Crabtree et al. | |
| 10,318,882 B2 | 6/2019 | Brueckner et al. | |
| 10,367,829 B2 | 7/2019 | Huang et al. | |
| 2003/0041254 A1 | 2/2003 | Challener et al. | |
| 2003/0145225 A1 | 7/2003 | Bruton et al. | |
| 2005/0289072 A1 | 12/2005 | Sabharwal | |
| 2007/0150744 A1 | 6/2007 | Cheng et al. | |
| 2009/0089227 A1 | 4/2009 | Sturrock et al. | |
| 2009/0182672 A1 | 7/2009 | Doyle | |
| 2009/0222562 A1 | 9/2009 | Liu et al. | |
| 2009/0293128 A1 | 11/2009 | Lippmann et al. | |
| 2011/0087888 A1 | 4/2011 | Rennie | |
| 2012/0266244 A1 | 10/2012 | Green et al. | |
| 2013/0073062 A1 | 3/2013 | Smith et al. | |
| 2013/0132149 A1 | 5/2013 | Wei et al. | |
| 2013/0191416 A1 | 7/2013 | Lee et al. | |
| 2013/0254857 A1* | 9/2013 | Bajenov | H04L 63/083 726/7 |
| 2013/0304623 A1 | 11/2013 | Kumar et al. | |
| 2014/0156806 A1 | 6/2014 | Karpistsenko et al. | |
| 2014/0244612 A1 | 8/2014 | Bhasin et al. | |
| 2014/0279762 A1 | 9/2014 | Xaypanya et al. | |
| 2015/0149979 A1 | 5/2015 | Talby et al. | |
| 2015/0163242 A1 | 6/2015 | Laidlaw et al. | |
| 2015/0169294 A1 | 6/2015 | Brock et al. | |
| 2015/0195192 A1 | 7/2015 | Vasseur et al. | |
| 2015/0213246 A1* | 7/2015 | Turgeman | H04L 63/08 726/23 |
| 2015/0236935 A1* | 8/2015 | Bassett | H04L 41/14 709/224 |
| 2015/0281225 A1 | 10/2015 | Schoen et al. | |
| 2015/0317481 A1 | 11/2015 | Gardner et al. | |
| 2015/0339263 A1 | 11/2015 | Ata et al. | |
| 2015/0347414 A1* | 12/2015 | Xiao | G06F 16/951 707/749 |
| 2015/0379424 A1 | 12/2015 | Dirac et al. | |
| 2016/0004858 A1 | 1/2016 | Chen et al. | |
| 2016/0028758 A1 | 1/2016 | Ellis et al. | |
| 2016/0072845 A1 | 3/2016 | Chiviendacz et al. | |
| 2016/0078361 A1 | 3/2016 | Brueckner et al. | |
| 2016/0088000 A1* | 3/2016 | Siva Kumar | H04L 63/1416 726/23 |
| 2016/0099960 A1 | 4/2016 | Gerritz et al. | |
| 2016/0105454 A1 | 4/2016 | Li et al. | |
| 2016/0140519 A1 | 5/2016 | Trepca et al. | |
| 2016/0275123 A1 | 9/2016 | Lin et al. | |
| 2016/0285732 A1 | 9/2016 | Brech et al. | |
| 2016/0350442 A1 | 12/2016 | Crosby | |
| 2016/0364307 A1 | 12/2016 | Garg et al. | |
| 2017/0019678 A1 | 1/2017 | Kim et al. | |
| 2017/0063896 A1 | 3/2017 | Muddu et al. | |
| 2017/0126712 A1 | 5/2017 | Crabtree et al. | |
| 2017/0139763 A1 | 5/2017 | Ellwein | |
| 2017/0149802 A1 | 5/2017 | Huang et al. | |
| 2017/0193110 A1 | 7/2017 | Crabtree et al. | |
| 2017/0322959 A1 | 11/2017 | Tidwell et al. | |
| 2017/0323089 A1 | 11/2017 | Duggal et al. | |
| 2018/0197128 A1 | 7/2018 | Carstens et al. | |
| 2018/0300930 A1 | 10/2018 | Kennedy et al. | |
| 2019/0082305 A1 | 3/2019 | Proctor | |

* cited by examiner

PRIVILEGE ASSURANCE OF ENTERPRISE COMPUTER NETWORK ENVIRONMENTS USING LOGON SESSION TRACKING AND LOGGING

CROSS-REFERENCE TO RELATED APPLICATIONS

Priority is claimed in the application data sheet to the following patents or patent applications, the entire written description of each of which is expressly incorporated herein by reference in its entirety:

Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
Ser. No. 62/568,312
Ser. No. 15/616,427
Ser. No. 14/925,974
Ser. No. 62/568,305
Ser. No. 62/568,307
Ser. No. 15/818,733
Ser. No. 15/725,274
Ser. No. 15/655,113
Ser. No. 15/616,427
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974
Ser. No. 16/777,270
Ser. No. 16/720,383
Ser. No. 15/823,363
Ser. No. 15/725,274
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
62/568,291
Ser. No. 15/616,427
Ser. No. 15/141,752
62/568,298
Ser. No. 15/835,312
Ser. No. 15/186,453
Ser. No. 15/813,097
Ser. No. 15/616,427
Ser. No. 15/806,697
Ser. No. 15/376,657
Ser. No. 15/237,625
Ser. No. 15/343,209
Ser. No. 15/237,625
Ser. No. 15/229,476
Ser. No. 15/206,195
Ser. No. 15/673,368
Ser. No. 15/376,657

BACKGROUND OF THE INVENTION

Field of the Invention

The disclosure relates to the field of computer management, and more particularly to the field of cybersecurity.

Discussion of the State of the Art

To this day, at least ninety percent of enterprises employ Microsoft Windows Servers to manage their IT domains and at the heart of this is Active Directory. Active Directory is not just a directory, it is a white-pages that lists employees, groups, devices, and relationships. It is an authentication provider and also a lightweight configuration management database (CMDB) for Windows resources, users, hardware, and applications. And finally, it is also a policy enforcement point that implements trust boundaries and enterprise security policies for devices, software, and users. Because it does all of these things, in one place, it is the pinnacle target for attackers.

Currently, the only solution to protect Active Directory is an indirect approach of securing access points into the network and responding once an attack is carried out. However, the Active Directory data model allows enterprises to define relationships between objects such that permissions to access and modify key IT resources (such as machines and data) can be defined transitively and highly counterintuitively over time for large enterprises. There exists no comprehensive preventative solution for protecting Active Directory and observing key characterizations of hygiene and enforcement of the widely accepted cybersecurity principle of "least privilege", thus leaving this keystone of modern technology vulnerable to compromise. While Active Directory is the most common directory access protocol, it is not the only one, and all such protocols suffer from similar defects.

What is needed is a system and method to prevent, mitigate, and detect attacks throughout computer networks by tracking logon sessions within a network along with details for each session, and logging suspicious sessions for inclusion in event monitoring for threat detection and mitigation.

SUMMARY OF THE INVENTION

Accordingly, the inventor has developed a system and method for the prevention, mitigation, and detection of cyberattack attacks on computer networks using logon session tracking and logging. The system uses an interrogation agent to monitor logon sessions within a network, track session details, and generate an event log for any suspicious sessions or details. Cyber-physical graphs and histograms using persisted time-series data provides critical information, patterns, and alerts about configurations, attack vectors, and vulnerabilities which enable information technology and cybersecurity professionals greater leverage and control over their infrastructure.

According to a preferred embodiment, a system for prevention, mitigation, and detection of cyberattack attacks on computer networks using logon session tracking and logging, comprising: an interrogation agent comprising a first plurality of programming instructions stored in a memory of, and operating on a processor of, a first computing device within a computer network operating a directory access protocol, wherein the first plurality of programming instructions, when operating on the processor of the first computing device, cause the first computing device to: receive a first plurality of session-based details for an authentication session for a user; check the validity of the first plurality of session-based details, using a stored session configuration; log the first plurality of session-based details; receive a second plurality of session details; compare the first and second pluralities of session details to identify any mismatched data; where invalid or mismatched information is identified in the first or second pluralities of session-based details, generate an event log indicating the particular session-based details that contain the invalid or mismatched information; send the event log to a graph engine; a graph engine comprising a second plurality of programming instructions stored in a memory of, and operating on a processor of, a second computing device, wherein the second plurality of programming instructions, when operating on the processor of the second computing device, cause the second computing device to: receive the event log; create and store a cyber-physical graph of the computer network using the event log, wherein the vertices of the cyber-physical graph represent directory access protocol objects and the edges of the cyber-physical graph represent the relationships between those objects; perform a plurality of queries over time on the cyber-physical graph a cyberattack parameter of interest; receive results of the plurality of queries; and send the results to a time-series rule comparator; a time-series rule comparator comprising a third plurality of programming instructions stored in a memory of, and operating on a processor of, a computing device, wherein the third plurality of programming instructions, when operating on the processor, cause the computing device to: receive the results from the graph engine; measure changes over time in the results; if the measurement of changes over time exceeds a threshold, send the results to a user interface; and a user interface comprising a fourth plurality of programming instructions stored in a memory of, and operating on a processor of, a computing device, wherein the fourth plurality of programming instructions, when operating on the processor, cause the computing device to: receive the results; identify the directory access protocol objects and relationships which caused the measurement of changes to exceed the threshold; and display a portion of the cyber-physical graph comprising the vertices and edges corresponding to the identified directory access protocol objects and relationships, is disclosed.

According to another preferred embodiment, a method for prevention, mitigation, and detection of cyberattack attacks on computer networks using logon session tracking and logging, comprising the steps of: collect a first plurality of session-based details for an authentication session for a user; check the validity of the first plurality of session-based details, using a stored session configuration; log the first plurality of session-based details; receive a second plurality of session details; compare the first and second pluralities of session details to identify any mismatched data; where invalid or mismatched information is identified in the first or second pluralities of session-based details, generate an event log indicating the particular session-based details that contain the invalid or mismatched information; sending the event log to a graph engine; creating and storing a cyber-physical graph of the computer network using the event log, wherein the vertices of the cyber-physical graph represent directory access protocol objects and the edges of the cyber-physical graph represent the relationships between those objects; performing a plurality of queries over time on the cyber-physical graph a cyberattack parameter of interest; receiving results of the plurality of queries; measure changes over time in the results; if the measurement of changes over time exceeds a threshold, sending the results to a user interface; identifying the directory access protocol objects and relationships which caused the measurement of changes to exceed the threshold; and displaying, on the user interface, a portion of the cyber-physical graph comprising the vertices and edges corresponding to the identified directory access protocol objects and relationships, is disclosed.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
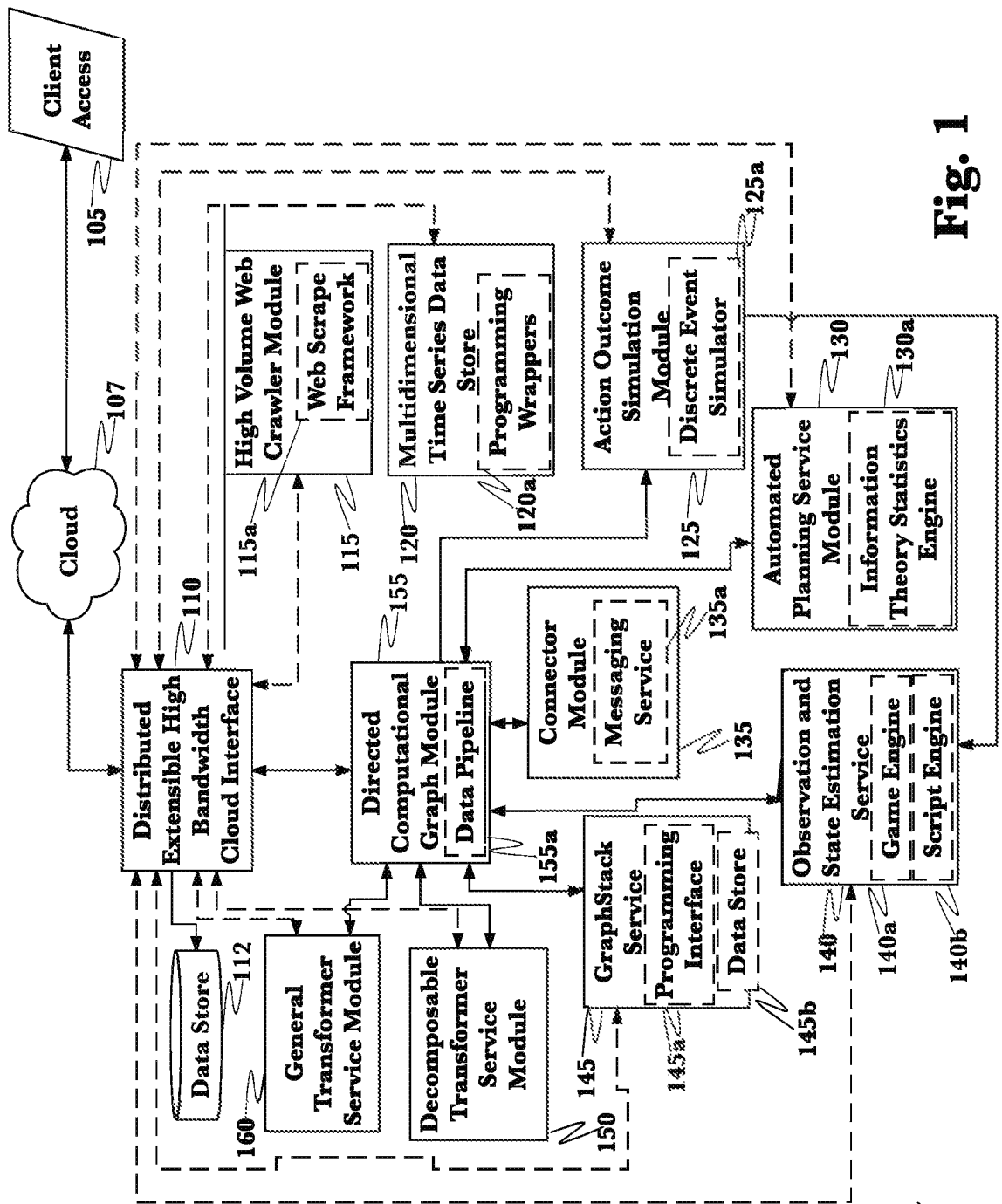
FIG. 1 is a diagram of an exemplary architecture of a business operating system according to an embodiment of the invention.

The inventor has conceived, and reduced to practice, a system and method for the prevention, mitigation, and detection of cyberattack attacks on computer networks using logon session tracking and logging. The system uses an interrogation agent to monitor logon sessions within a network, track session details, and generate an event log for any suspicious sessions or details. Cyber-physical graphs and histograms using persisted time-series data provides critical information, patterns, and alerts about configurations, attack vectors, and vulnerabilities which enable information technology and cybersecurity professionals greater leverage and control over their infrastructure.

Since its release in 2000, Microsoft's Active Directory (AD) has become central operating and management hub for most enterprises. Active Directory is a database that helps organize and manage a company's users, computers, and policies. It provides authentication using protocols such as Kerberos and NTLM to applications, file services, printers, and other on-premises resources. It employs the Lightweight Directory Access Protocol (LDAP) to query and modify items within the AD database. AD tools allow administrators to create, delete, or modify users, devices, and services. AD tools also manage relationships, organizational structures, and policy enforcement. These tools are numerous and are dispersed throughout the operating system. With so many administrative and security accounts, passwords, and tools in one place, it is imperative that organizations secure and safeguard AD to the highest degree. While Active Directory is the most common directory access protocol, it is not the only one, and all such protocols suffer from similar defects.

For most enterprises, Active Directory infrastructure is aging, underfunded, and complex. Enterprises find it challenging to stop attackers from exploiting Active Directory, because it needs to be open in order to work, and the ways to configure (and mis-configure) it are endless. The consequences of a catastrophic data breach are severe, but the damage from an Active Directory attack extends beyond the breach. It weakens the assurances cybersecurity professionals provide to their regulators, customers, and partners. That is because Active Directory and similar systems provide authentication for employees—a crucial IT control. When authentication is compromised, the integrity of the entire security program is compromised as well.

Current industry practices to protect or at least manage AD security entail periodic scrubs performed by low-level IT personnel. This is no trivial task as the tools to do this have not changed much in twenty years and the power to see meaningful relationships is non-existent. Right now, IT personnel must manually navigate between numerous tools (not co-located) or command line interfaces just to see a small fraction of the available data, and the data is spread between various collapsible-trees, windows, tabs, lists, or lines of text, where the most powerful tool is a sorting or filtering option. Considering only user accounts, which is only one type of AD object, even a mid-sized company with an average turnover rate may have thousands upon thousands of entries, not to mention the various settings under each account. The periodic scrub should, but often doesn't, cover over-privileged accounts, password-policy compliance, stale accounts, end-of-life hardware, software patches, outdated antivirus definitions, group policy enforcement, among many other administrative tasks known to those in the industry. There are other sets of data (logon activity, active sessions, web-activity, file-sharing, and Kerberos transactions to name a few) that are completely ignored because there is no accessible way for personnel to reasonably view and manage the data. Active directory is simply too large and complex for current day administrative processes.

Inherent in the task of managing AD, is the fact that cybersecurity defenders must always take part in a cat-and-mouse game. Modern day attackers are ahead of the curve because they have started connecting data finding numerous attack vectors, where defenders are still analyzing lists, which are nothing more than disconnected data points. The solution is an Active Directory interrogation agent paired with persistent time-series data and centralized graph-centric administration tools. These graph-centric tools provide IT personnel with organizational and security insights previously too impractical to discover previously and closes the gap between attackers and defenders.

According to one embodiment, an AD agent (one per forest) begins an initial set of LDAP queries to one or more domain controllers (DC) in order to collect current AD configuration parameters and objects. Optionally, the Server Message Block (SMB) protocol may be used to collect local administrator and user session information on client machines. After the baseline set of queries are complete, the AD agent only sends updates during off-peak hours to lessen the bandwidth burden. ICMP and SNMP should also be noted as other protocols that may be used to expand the data collection scope, depending on the user's preference.

By using LDAP and SMB, a large plurality of data elements may be collected by the AD agent. Some of these data elements include: AD configurations parameters (including domains, trusts, groups, users, computers, Organizational Units (OU), and Group Policy Objects (GPO)), stale accounts, non-compliant password accounts, Kerberos principal names, user profile settings, logon activity, Access Control Lists, local admin accounts, and session information. Persisted over time, this data becomes time-series data and is sent to a graph engine and web-interface for further analysis.

A graph engine builds a cyber-physical graph by representing AD objects as vertices (also known as nodes) where the vertices represent directory access protocol objects (e.g., Users, Groups, Computers, and Domains) that can be interacted with throughout the domain. Then relationships called edges are established between these vertices and represent actions needed to act on those vertices. A few notable relationships are: MemberOf (where a user, group, or computer is a member of another group), AdminTo (where a user, group, or computer has local administrator rights on a computer), HasSession (where a user has a session on a computer), and TrustedBy (where a domain is trusted by a different domain). The cyber-physical graph is a directed graph representing both the physical and logical relationships among entities within the network.

A web-interface also transforms time-series data into histograms (potentially other types of graphs) and performs default queries that enable rapid observations not previously available to professionals. For example, a sharp increase in admin accounts or mass permission changes are some behaviors now observable through this time-series data analysis. Even the simplest of histograms can provide organizational and relational insights that lists from existing tools fail to convey. Observing historical logon failures and account lockouts, service requests, and percentages of users with admin rights are some previously untapped intuitions about malicious activity or potential weaknesses that are now possible.

The Active Directory monitoring capabilities proactively identify weaknesses across the domain: misconfigured accounts and Domain Controllers, accounts and administrators with over-allocated privileges, an unnecessarily high quantity of users, trusts, domains, administrators, and groups. With the graph engine capabilities, it is easy to explore hidden relationships and interdependencies within Active Directory to expose true relationships and authorities. This helps uncover complex attack paths that would be readily exploited by attackers but are only visible when viewing graphs of AD rather than lists of privileges. Continuous AD monitoring and health reporting effectively highlights users who are not using allocated privileges, trusts that are not utilized, and groups that are not properly configured. Integrated summaries of AD environment health provide ongoing metrics and reporting for the following: AD permissions graph analysis, stale accounts, enumeration of domain and forest trusts, domain metrics, Kerberos password reset times, null session enabled in DCs, accounts in domain admin groups without password expiry, Non-admin user abilities to add computers within a domain, account and group creation and membership to include frequency of change.

This solution provides the ability to audit and alert on specific Active Directory changes and render workable the complexity problem through intelligible and interactive representation. Using time-series data structures to create an understanding of the current state of the Active Directory, the graph engine generates visualizations of what has changed over certain time periods and allows for specific querying for a true Active Directory audit.

Because this embodiment works over the LDAP and SMB protocol, it can be applied to other enterprise management systems such as Apache Directory, Open LDAP, JXplorer, among other alternatives. However, for the sake of simplicity, this disclosure will focus on the most prominent software package which is Microsoft's Active Directory.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

Figure 12:
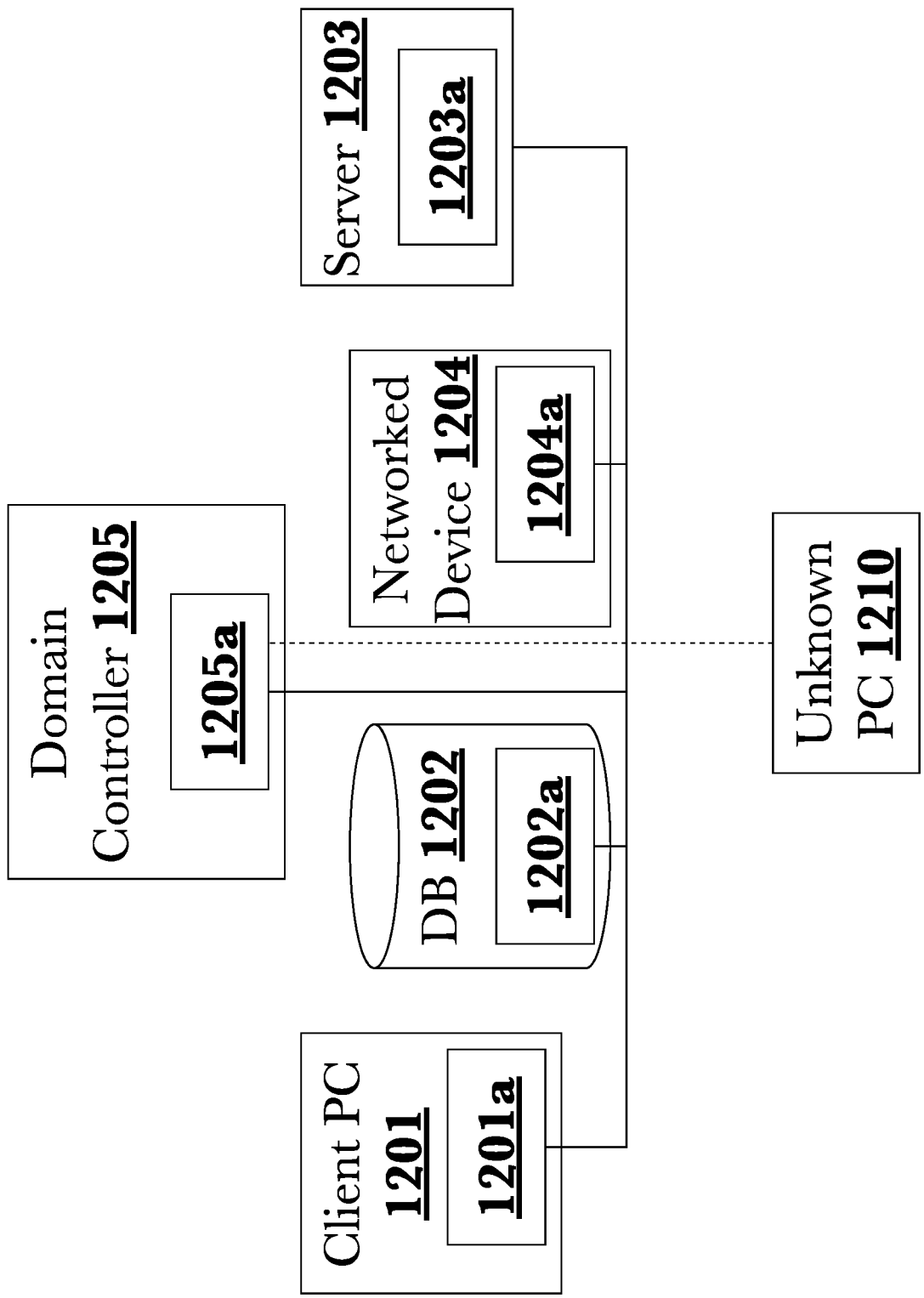
FIG. 12 is a block diagram illustrating the use of local session monitors to log session details at various endpoints within a network.

FIG. 12 is a block diagram illustrating the use of local session monitors to log session details at various endpoints within a network. According to the embodiment, a network may utilize a plurality of local session monitors 1201a-1205a, that may be installed on various network endpoints such as (for example, including but not limited to) client computers 1201 such as employee workstations or personal devices such as employee or guest PCs, smartphones, tablets, or other computing devices, databases 1202 that may utilize session-based authentication for access to stored information, servers 1203 that may provide session-based services such as Kerberos-based authentication or various single-sign-on (SSO) software applications used within the enterprise, other networked devices 1204 such as network printers, Internet-of-things (IoT) devices, or any other network-connected device that may utilize session-based authentication, or at a domain controller 1205 responsible for receiving authentication requests and issuing (or denying) authentication tickets.

A local session monitor 1201a-1205a may be operated as an in-line or passive listener for session-based traffic at the host where it is installed, collecting and logging any session-related details such as authentication requests, authentication approval or denial, ticket details, session-specific details such as data or timestamp information, host-based details such as hardware or software configuration or local user logons with associated session/user identifiers, or any other information pertaining to an authentication session or a session attempt. This enables real-time collection of session information as new sessions are requested and as a live session is used while a user interacts with network endpoints, enabling quick response to any issues as they occur (as described below, with reference to FIGS. 13-14).

When an unknown device 1210 connects to the network, it may not have a local session monitor installed. For example, this may be the case when an enterprise allows bring-your-own-device (BYOD) for employees and guests to utilize personal devices on the internal network, or when an intruder connects to the network to attempt to compromise one or more devices or services. When an unknown device attempts to authenticate, a local session monitor 1205a operating at the domain controller 1205 may log the details of the authentication request and any issued tickets for the unknown device. This enables secure monitoring of unknown and new devices with no required configuration on the unknown device, instead collecting all the pertinent information at the domain controller when the device attempts to authenticate.

Figure 13:
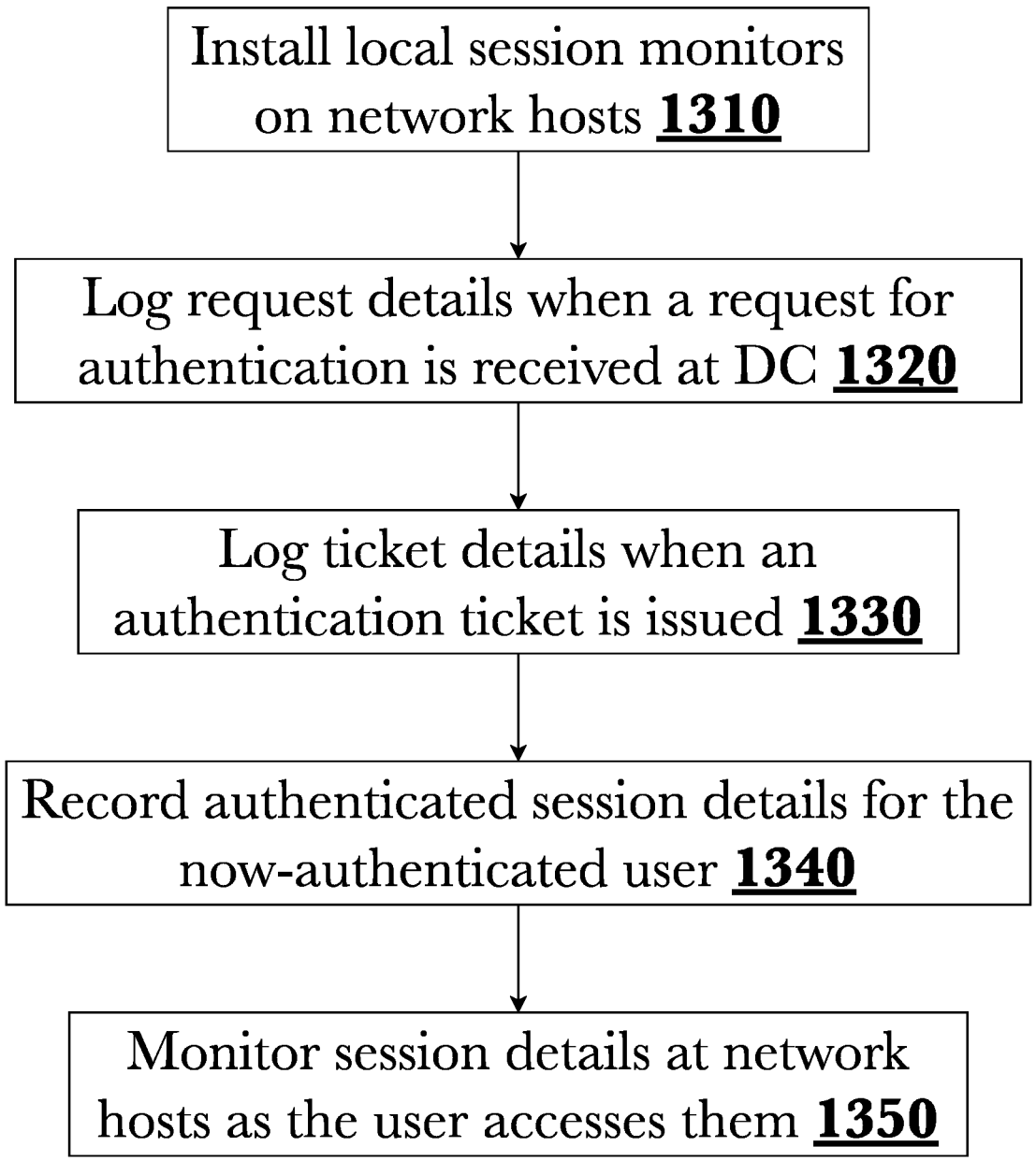
FIG. 13 is a flow diagram illustrating an exemplary method for the use of an interrogation agent for session tracking within a network.

FIG. 13 is a flow diagram illustrating an exemplary method for the use of an interrogation agent for session tracking within a network. According to the method, an interrogation agent 503 (as described below in greater detail, with reference to FIG. 5) may be installed on a plurality of network endpoints 1310 such as a personal computer or a server within a network, or any network-connected device that may be involved in a user session (for example, databases a user might access using their authenticated session within the network). When an authentication request occurs 1320, for example at an interrogation agent operating on a domain controller where a request for authentication is received, request details may be logged such as the user's name and any relevant host information such as hardware or software configurations. When an authentication ticket (e.g. Ticket-granting Ticket or Service Ticket) is issued, for example, as may be monitored by an interrogation agent on a domain controller where the ticket originates or using an interrogation agent operating on a user's device where the ticket is received, ticket details may be recorded 1330 such as the start time, expiration window, user name, host information such as software or hardware configuration, or other session-specific information. The authenticated session details may then be recorded 1340 and monitored throughout the session, for example using additional interrogation agents installed on other network endpoints accessed or interacted with by the user's authenticated session 1350. This enables active monitoring of a session as the user traverses the network, interacting with resources such as servers, databases, or other network-connected devices, and maintaining a live view of the user's session details to identify suspicious activity as it begins.

Figure 14:
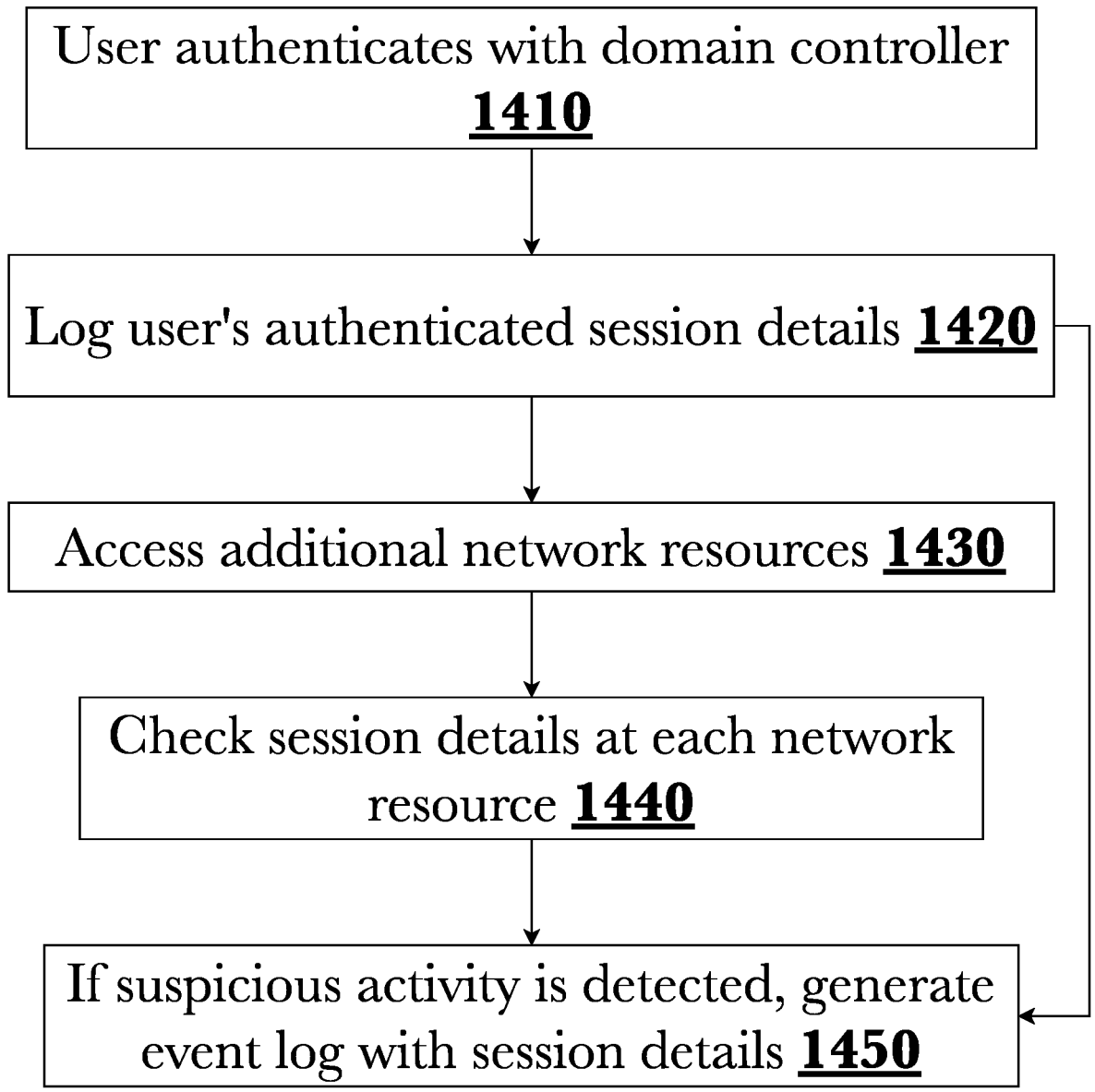
FIG. 14 is a flow diagram illustrating an exemplary method for detecting a potential attack using session monitoring and event logs.

FIG. 14 is a flow diagram illustrating an exemplary method for detecting a potential attack using session monitoring and event logs. When a user authenticates 1410 by requesting and receiving an authentication ticket from a domain controller, their session details are logged 1420 and monitored as they traverse the network and interact with various network resources such as servers, databases, and other network-connected devices or services. If the initial session details contain suspicious data, such as a mismatched user or account name or an invalid expiration date that violates the configured rules for the domain controller, an event log may be generated 1450 indicating the suspicious activity immediately. When the user accesses a network resource using their authenticated session 1430, the details of the session are again checked against the logged details 1440. If a mismatch occurs, this may indicate that the session has been tampered with or falsified such as in a pass-the-ticket type attack, and an event log is generated 1450 indicating the suspicious activity. This approach maintains active monitoring of the user's session as they operate within the network and interact with various resources, alerting security systems and personnel immediately when suspicious session activity is detected. This enables rapid response and mitigation of threats before the session can be used to gain illicit access or damage internal resources, by recognizing the potential attack as the session begins rather than relying on detection of malicious activity using an already-authenticated session.

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs via a network connection 107 through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are vertices and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never used by it before to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120a, rigorous analysis of the network baseline by the directed computational graph 155 with its underlying general transformer service module 160 and decomposable transformer service module 150 in conjunction with the AI and primed machine learning capabilities 130a of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125a which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140*b*

Figure 2:
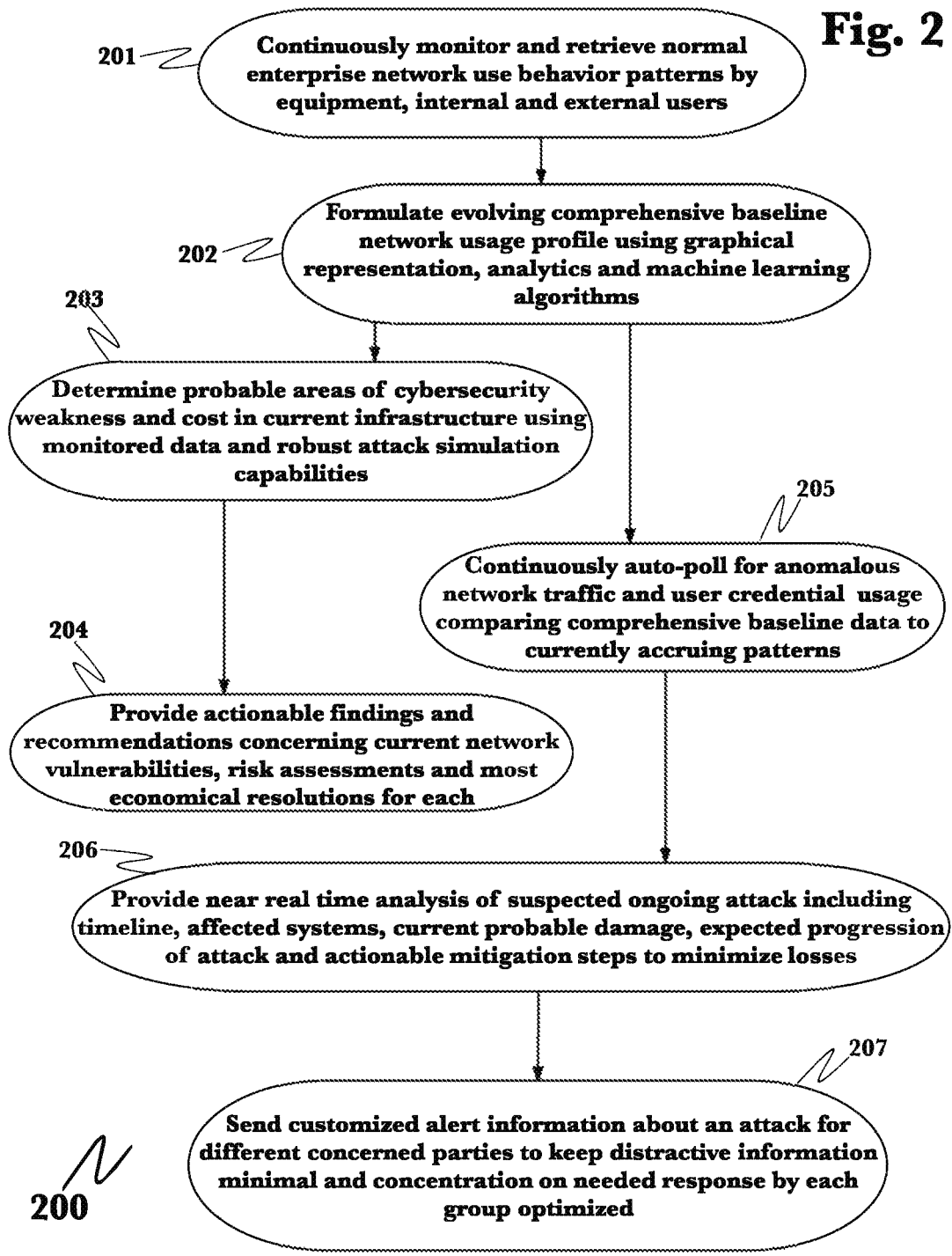
FIG. 2 is a flow diagram of an exemplary function of the business operating system in the detection and mitigation of predetermining factors leading to and steps to mitigate ongoing cyberattacks.

FIG. 2 is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120*a*. All captured data are then analyzed to predict the normal usage patterns of network vertices such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145*a*, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by predesignated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

Figure 3:
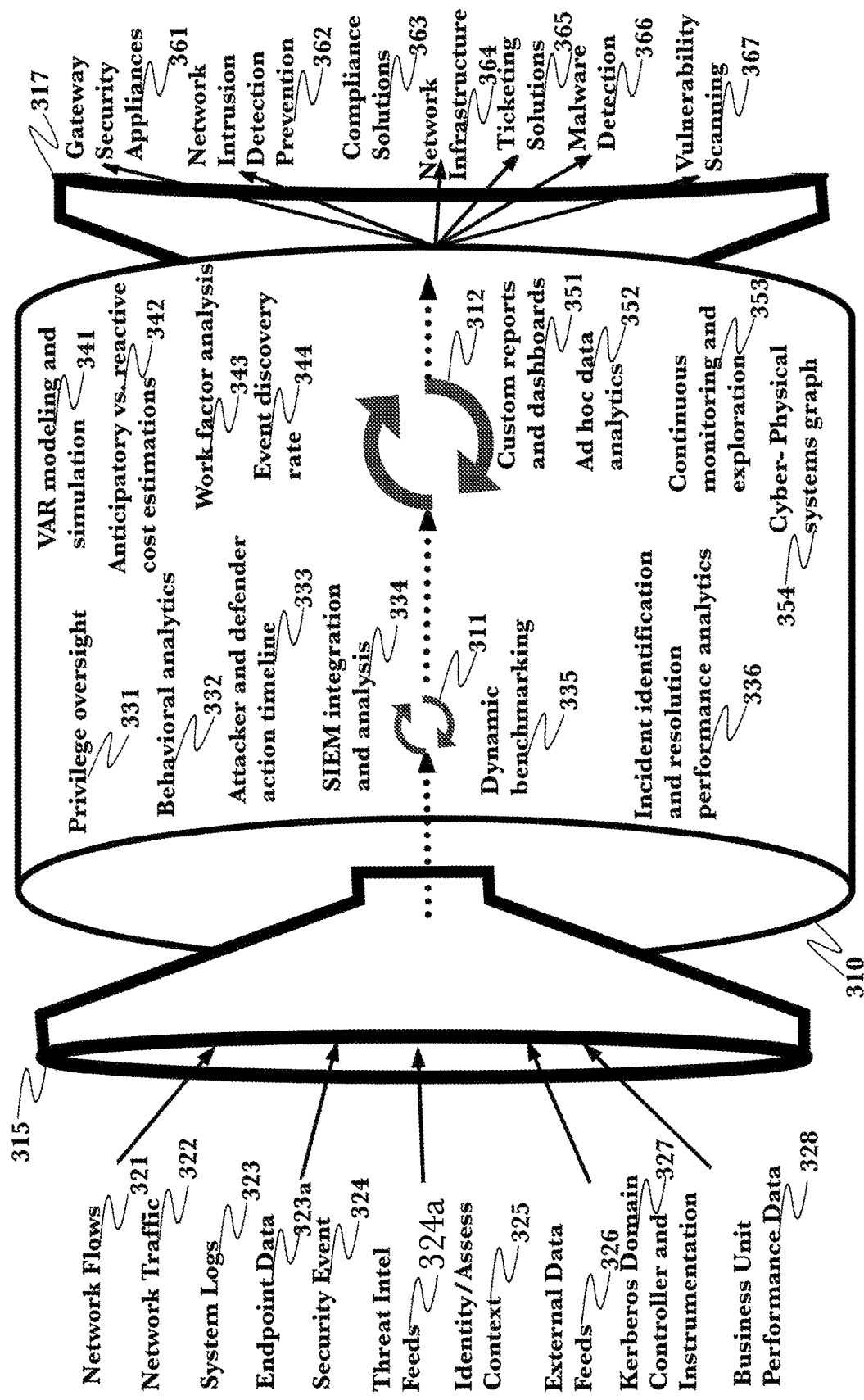
FIG. 3 is a process diagram showing business operating system functions in use to mitigate cyberattacks.

FIG. 3 is a process diagram showing business operating system 300 functions in use to mitigate cyberattacks. Input network data which may include network flow patterns 321, the origin and destination of each piece of measurable network traffic 322, system logs from servers and workstations on the network 323, endpoint data 323*a*, any security event log data from servers or available security information and event (SIEM) systems 324, external threat intelligence feeds 324*a*, identity and assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 4:
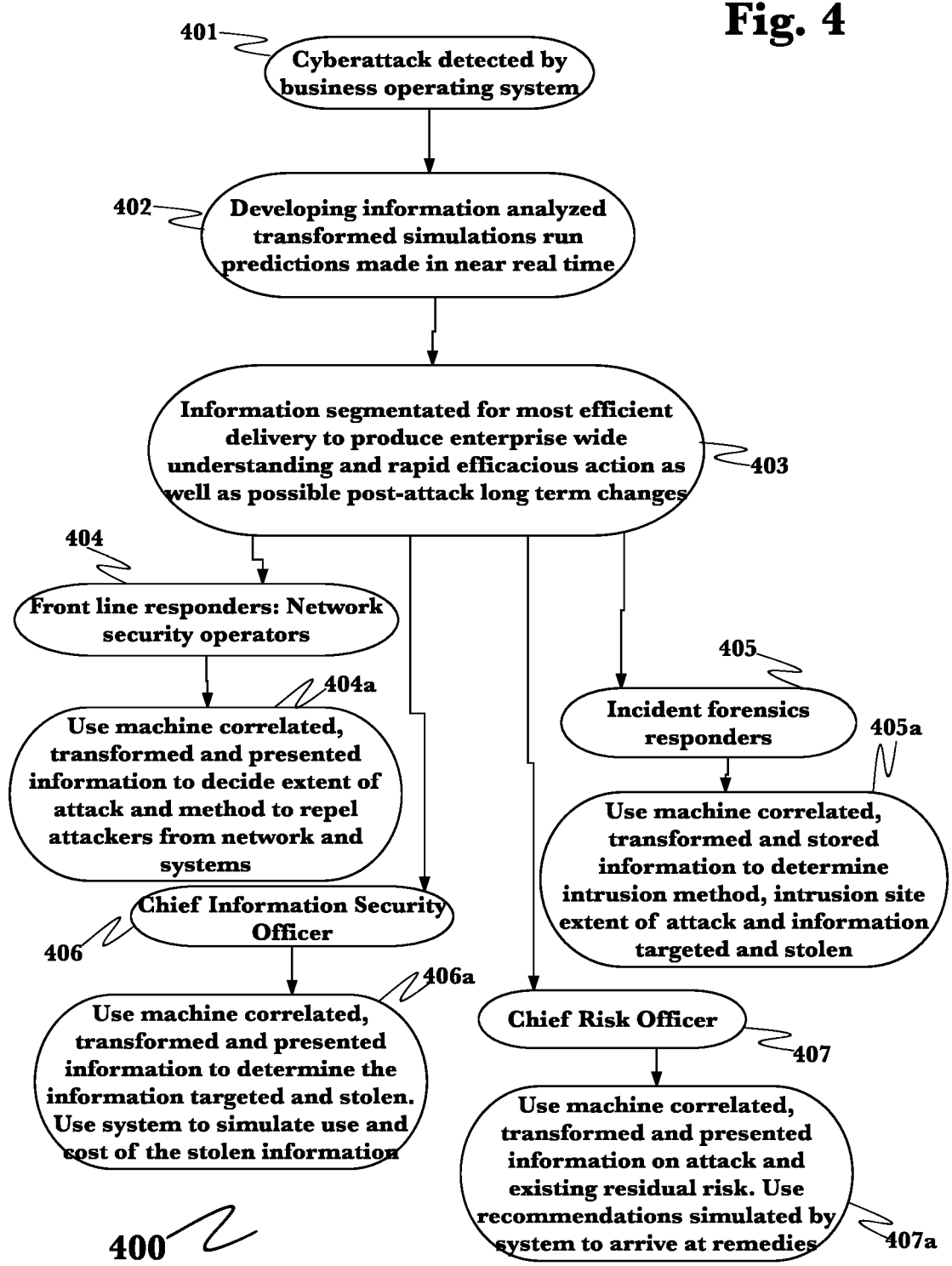
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused embodiment may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405a to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407a was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

As the embodiment is expressively scriptable in a large number of programmed capabilities, which include data presentation, the segmentation of information, parties chosen to receive information, and the information received would be expected to vary, perhaps significantly, between corporate clients of business operating system cybersecurity embodiments depending on individual corporate policies, philosophies and make-up, just to name a few examples.

Figure 5:
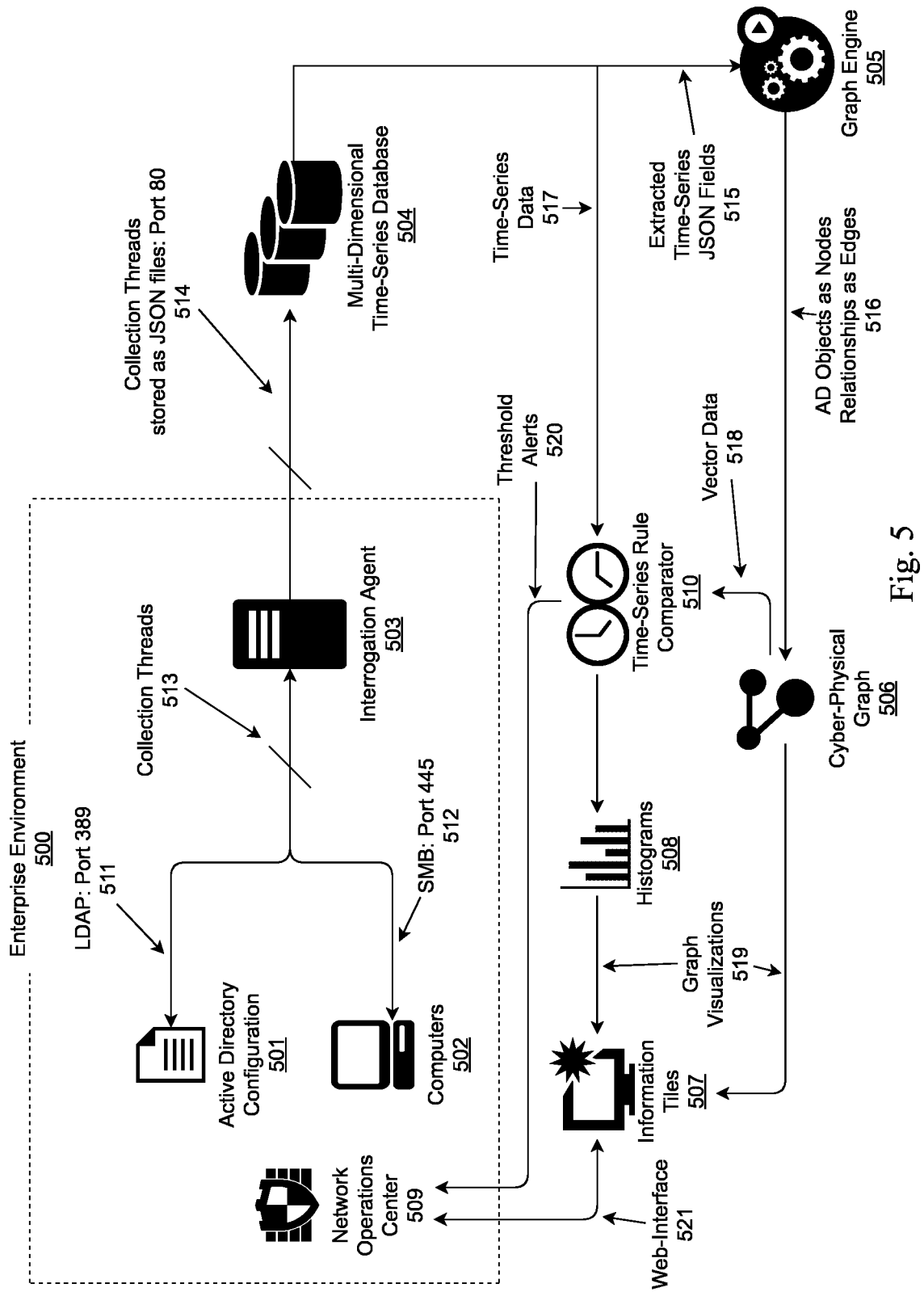
FIG. 5 is a diagram of an exemplary system architecture for an Active Directory Protection Platform.

FIG. 5 is a diagram of an exemplary system architecture for a privilege assurance platform for Active Directory protection. In this embodiment, an interrogation (AD) agent 503 has been installed in at least one domain-joined machine within the enterprise computer network environment 500. This machine is typically located in a server room co-located with other member servers but is not limited to any one location or device and only one per forest is required. Using port 389 511, the AD agent 503 performs a series of LDAP queries 511 on a domain controller, retrieving the Active Directory configuration parameters, system and device logs, privilege and access information, and other information generated by devices or systems on the network relevant to privilege assurance 501. Optionally, SMB queries over port 445 512 may be made by the AD agent 503 to any computers 502 on the domain in order to retrieve session and local administrator information.

In order to do this, the AD agent 503 puts each LDAP and SMB query (users, groups, sessions, etc.) into a task pool where each task (i.e., query) can be run in parallel using multithreading 513 techniques. During the initial set up (creating a baseline) of the AD agent 503, all collection thread responses are stored as JSON files to an off-site multi-dimensional time-series database (MDTSDB) 504 over port 80 514. Future iterative updates to the JSON files only occurs when changes are detected by the AD agent 503. Additionally, it may be configured such that these changes only update during off-peak hours to limit the required bandwidth. All baseline files and changes to the baseline files are persisted in the MDTSDB 504 to provide a historical reference that other tools cannot provide.

Interrogation agent 503 may be installed on any network endpoint (i.e., any server, computer, or other network-connected device) that is part of the authentication domain, according to where authentication ticket monitoring may be needed. This allows the interrogation agent 503 to monitor login sessions at the network endpoints where they occur or are authenticated, to detect attacks such as pass-the-ticket or forgery attacks. Various details about a given session may be monitored and logged, such as (for example, including but not limited to) start and end times for a session, renewal time or expiration period for a logon, or related session data such as host information for the computer at which the user authenticated (for example, hardware or software configuration). This enables monitoring for invalid or falsified values in such details, for example if a user forges an authentication session with a nonsensical expiration that violates the domain controller's configuration (as may occur in a golden ticket attack), or if a user authenticates on a computer that does not comply with required or enforced software or hardware requirements such as password complexity, operating system version level, presence of hardware-based security, or other such host-specific details. Pass-the-ticket type attacks can also be detected by comparing the user name specified in a session against the client name specified in the authentication ticket being used for the session, quickly revealing any instances of a session using an invalid ticket. By monitoring session details, more complex analysis heuristics can be easily implemented due to the availability of user and session details that may be readily observed by the interrogation agent 503, and generating event logs immediately for suspicious activity based on the user and session information rather than waiting for suspicious behavior to occur. This allows security personnel and administrators to rapidly respond to threats before an attack occurs, detecting falsified or altered sessions immediately rather than detecting suspicious activity as a result of such a session going unnoticed.

According to this embodiment, which uses a cloud-computing architecture such as the one contained in U.S. patent application Ser. No. 15/237,625, and is incorporated herein by reference, the JSON field data 515 (from the collection threads 514) is ingested by a graph engine 505 which creates a cyber-physical graph 506. This is accomplished by mapping AD objects as graph vertices (users, groups, computers, sessions, organizational units, group policy objects, and domains) 516 where the vertices are discrete objects that can be interacted with throughout the domain. Then relationships called edges 516 are established between these vertices and represent measures needed to act on those vertices. Relationships such as MemberOf (where a user, group, or computer is a member of another group), AdminTo (where a user, group, or computer has local administrator rights on a computer), HasSession (where a user has a session on a computer), TrustedBy (where a domain is trusted by a different domain), and many more like ForceChangePassword, AddMembers, CanRDP, CanPSRemote, ExecuteDCOM, SQLAdmin, AllowedToDelegate, GetChanges, WriteDacl, GenericWrite, WriteOwner, Owns, Contains, AllExtendedRights, GpLink, AllowedToAct, and AddAllowedToAct.

This cyber-physical graph 506 serves two purposes. The first of which is to perform a series of default queries, turn those query results into a set of vectors 520 (based on the resulting vertices and edges), and send those vectors 520 to a time-series rule comparator 510. The second purpose of the cyber-physical graph 506 is to provide visualizations of data 519 to professionals to gain deeper insights and advanced decision capabilities about their network.

Regarding the first purpose, the vector data 518 along with time-series data 517 (the raw data from the collection threads 514) is ingested by the time-series rule comparator 510. This comparator 510 tracks changes over time with respect to specific time-series variables 517 or vector data 520 that are common targets for threat actors. If a change of a certain magnitude is detected in a certain parameter or parameters (e.g., path length to users with admin credentials, number of, or magnitude of, increases in security privileges, etc.) within a specific time frame, this may indicate malicious or suspicious behavior. Accelerations or decelerations in such changes may also be monitored. If such a threshold is met, a threshold alert 519 is sent to cybersecurity personnel or to a network operations center 509 so the attack can be met with a timely response. Threshold alerts 519 can be configured to be sent over any modern communication means such as phone texts, emails, or desktop notifications.

Thresholds may be time-dependent and could vary from a small change to a large change. One example that generates a threshold alert 520 would be any changes to the members of the Domain Admins group during non-business hours. Another example would be tracking the changes made to path vectors closing in on a Domain Admins group. Vectors made from each path (see FIG. 6) to the Domain Admins group should exhibit stochastic behavior while monitoring privilege changes so if the changes become linear, where one change in the path precedes changes in subsequent path vertices leading to the Domain Admins group, then it would indicate a concurrent lateral attack path being utilized by an attacker. If this were to take place, a threshold alert 519 to cybersecurity personnel would give them the ability to rapidly isolate the vector of attack (by linking the cyber-physical graph path) and shut down the path before the attacker could fully comprise the network. It is not only changes in vertices towards the Domain Admins group but also the path of sessions that could be tracked.

Regarding the second purpose of utilizing cyber-physical graphs 506 for data visualizations 519, histograms 508 are another graph tool used to display the time-series data 517 for users. Both graphs can be used by professionals to gain deeper insights and analytics that assess risk across domains associated with hidden or complex interrelationships, risky configurations, critical changes, and behaviors such as privilege escalation. These graphs are displayed in a web-based interface 521 containing Active Directory information tiles 507. The JSON data 514 is parsed into one of a plurality of the exemplary fifteen tiles disclosed in FIG. 7 along with relevant histograms 508 and cyber-physical graphs 506. While this information is the same information you may already gather from existing AD tools, the information from existing AD tools is disconnected and must be gathered from many different toolsets and windows and is presented in numerous lists or text files. Additionally, existing tools only give you the information at present and not time-series (historical) information. This aspect of the embodiment gathers this disconnected and disparate data, makes meaningful connections, performs default queries, generates histograms 508 and cyber-physical graphs 506, and presents all the data in one place. More details about the information tiles 507 may be found in FIG. 7.

Figure 6:
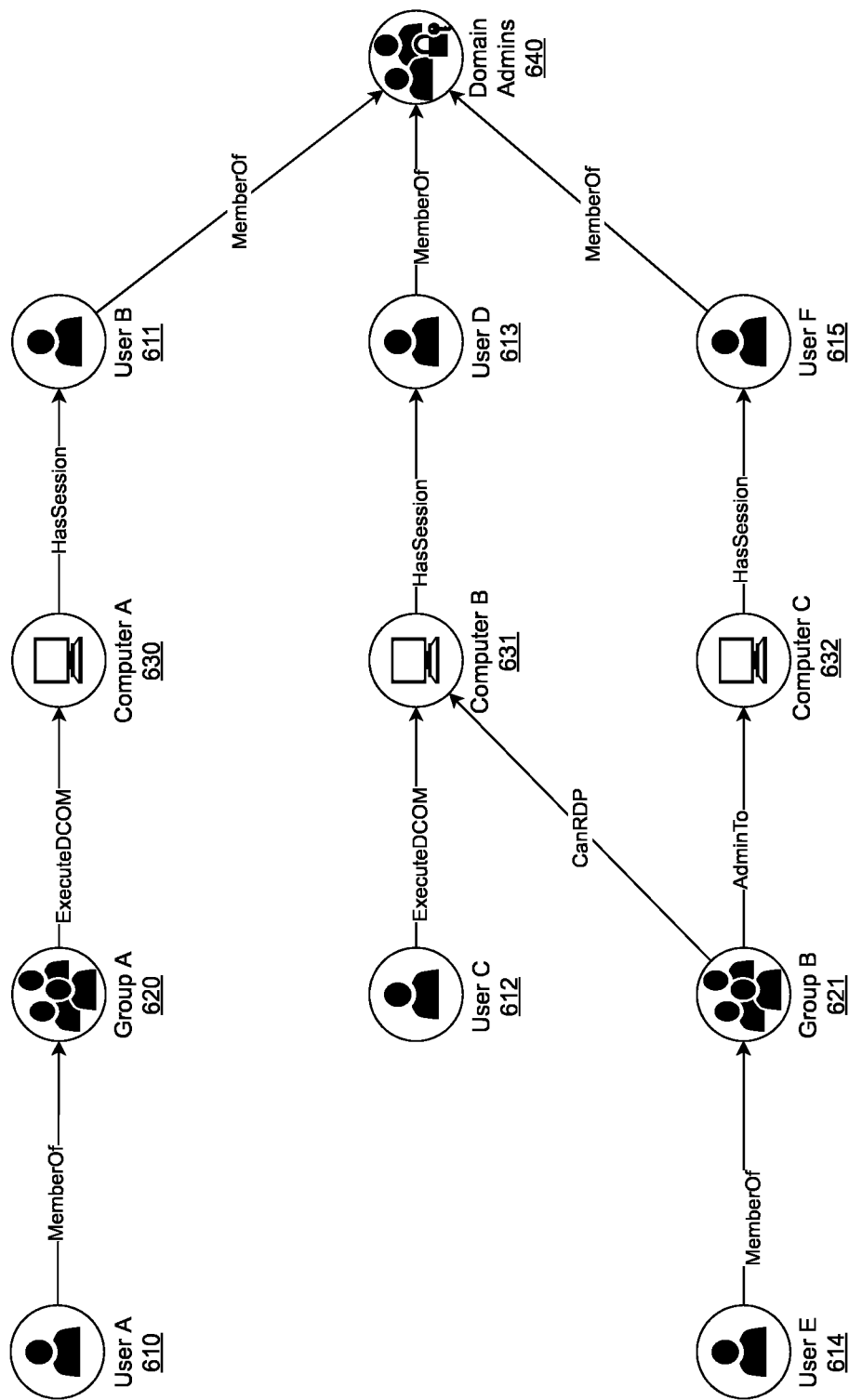
FIG. 6 is a diagram of an exemplary cyber-physical graph showing various pathways to access the Domain Admins group.

FIG. 6 is a diagram of an exemplary cyber-physical graph 600 showing various pathways to access the Domain Admins group 640. This graph 600 represents a simplified version of a graph generated from the query "find shortest paths to domain admins" which in some embodiments may use variants of the Monte Carlo Tree Search and A-star search algorithms (which are graph traversal and path search algorithms especially useful in adversarial scenarios such as a malicious actor pivoting through an IT enterprise). The possible configurations of this graph 600 are as numerous as the amount of ways to configure an enterprise IT environment. The utility of this graph is to understand to what AD objects are in the most likely path of an attack. Any node or edge may be selected by a user for additional information such as how it can be abused or what configuration settings need to be considered.

The most obvious accounts that need immediate protection are users B 611, D 613, and F 615 as they are actual members of the domain admin group 640. That information may be gleaned from existing AD tools but what those tools cannot easily provide is the relationships those users 611, 613, and 615 have to other vertices in the domain. If computers A 630, B 631, and C 632 each have sessions of a domain admin, then an attacker need not comprise domain admin accounts, but a computer which stores their passwords. If the computers are secure, phishing attacks on users A 610, C 612, or E 614 might prove successful, wherein users are tricked into revealing sensitive information through an email or other communication that appears to come from a trusted source. Other vectors of attack may be discovered by querying vertices such as Group A 620 or B 621. Such a query that would reveal all the users of that group and potential points of compromise.

Other vertices not shown in this diagram are domains, group policy objects, and organizational units. Edges possible in cyber-physical graphs comprise: AdminTo (a local administrator), MemberOf (Groups of members that share any privileges the group itself has), HasSession (user authentication credentials left on a system), ForceChangePassword (the ability to change the target user's password without knowing the current value), AddMembers (the ability to add arbitrary users, groups or computers to the target group), CanRDP (remote into a target computer), CanPSRemote (enter an interaction session with a target computer), ExecuteDCOM (allows remote code execution), SQLAdmin (user is a SQL admin), AllowedToDelegate (authenticate as other users), GetChanges/GetChangesAll (may perform a DCSync attack), GenericAll (full object control, including the ability to add other principals to a group, change a user password without knowing its current value, register an SPN with a user object, etc.), WriteDACL (the ability to write a new ACE to the target object's DACL. For example, an attacker may write a new ACE to the target object DACL giving the attacker "full control" of the target object), GenericWrite (the ability to update any non-protected target object parameter value. For example, update the "scriptPath" parameter value on a target user object to cause that user to run your specified executable/commands the next time that user logs on), WriteOwner (the ability to update the owner of the target object. Once the object owner has been changed to a principal the attacker controls, the attacker may manipulate the object any way they see fit), Owns (modify object regardless of permissions), Contains (objects are inside the container), AllExtendedRights (the ability to perform any action associated with extended Active Directory rights against the object. For example, adding principals to a group and force changing a target user's password are both examples of extended rights), GpLink (a linked GPO to objects in a container), AllowedToAct (may impersonate some domain users), AddAllowedToAct (may control what principals impersonate other domain users), and TrustedBy (domain trusts).

This embodiment performs a set of default queries on a cyber-physical graph which users may navigate including, but not limited to: find all domain admins, find shortest paths to domain admins, find principals with DCSync rights, users with foreign domain group membership, groups with foreign domain group membership, map domain trusts, shortest paths to unconstrained delegations systems, shortest paths from Kerberoastable users (Kerberoasting being theft of service account credentials by harvesting password hashes for AD user accounts with servicePrincipalName (SPN) values), shortest paths to domain admins from Kerberoastable users, shortest paths from owned principals, shortest paths to domain admins from owned principals, and shortest paths to high value targets. These are accessed through the tile toolset described in FIG. 7.

Figure 7:
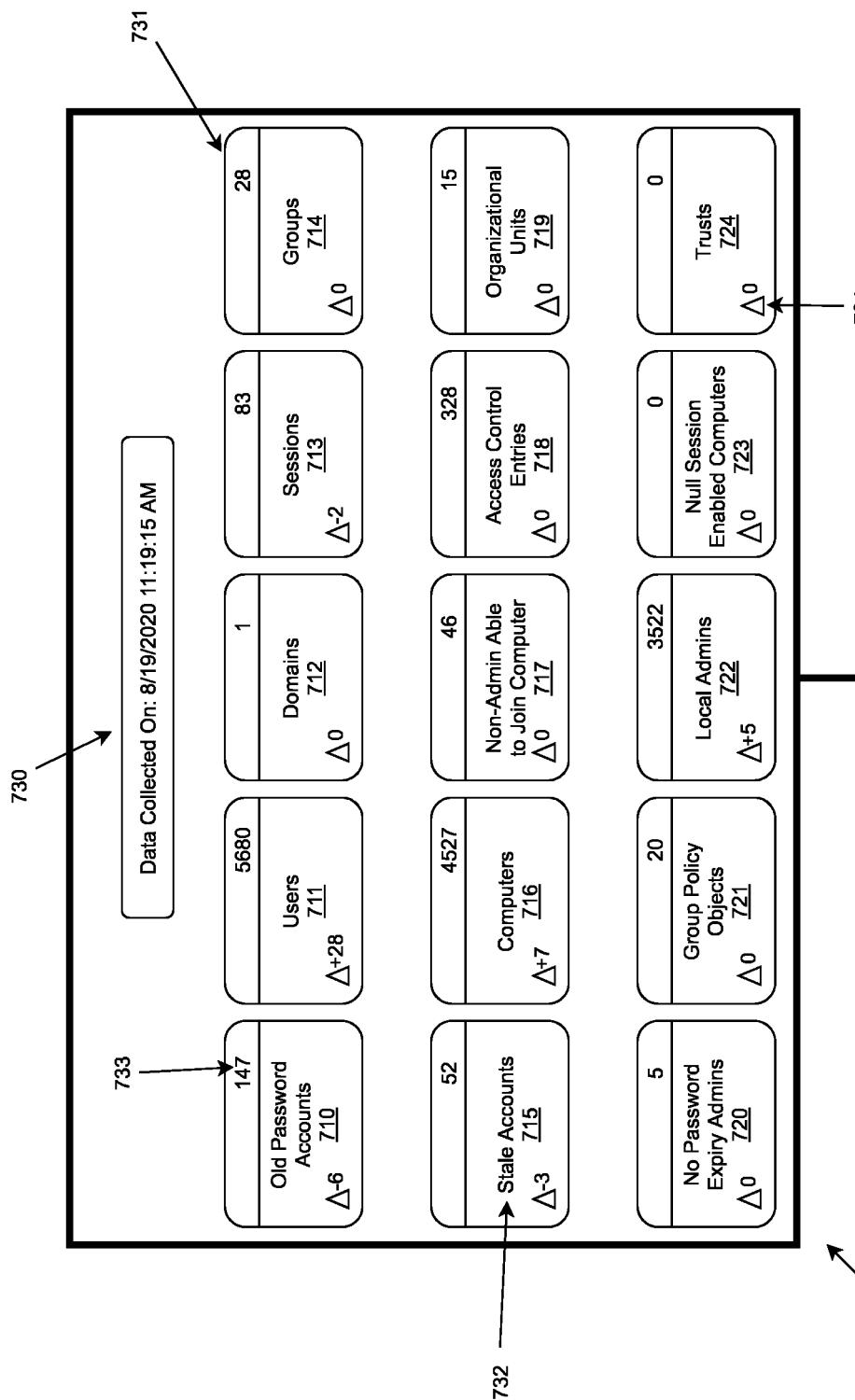
FIG. 7 is a diagram of an exemplary toolset for an Active Directory Protection Platform.

FIG. 7 is a diagram of an exemplary toolset for an Active Directory Protection Platform. This diagram is an example of one configuration of tiles displayed at once on a computing device 700. This non-exhaustive list of tiles is exemplary and tiles other than those shown may be utilized. This arrangement of information presented to a user consists of a collection date and time 730 and two types of tiles: assessment tiles and potential risk tiles. Assessment tiles provide a count of objects or other architectural elements of the AD environment. These tiles are helpful in routine assessments or forensic investigation, including easy identification of significant changes or trends. Potential risk tiles represent data collected regarding configuration parameters (often default) that are particularly susceptible to AD-based attacks. These should be reviewed regularly for known risky or suboptimal configurations and unusual activity. Each tile 731 comprises a title 732, the number of data points within the category 733, and the number of changes since the last update 734. The tiles further act as links, where the user may click on a tile to bring up additional details and a more in-depth analysis. This includes cyber-physical graphs such as the one in FIG. 6, histograms showing trends over time, and additional default queries.

The old password accounts tile 710 (a potential risk tile) displays the total count of users with passwords that have not been reset in specified time (ninety days by default). Clicking the tile displays each account, with the ability to look at additional user details, including the following (if available): user ID (email address), display name (name displayed for user which is typically different than an email address), domain (the domain in which the account exists), password expired (true or false), password last changed (date and time the password was last reset), account last login (date and time of last login), Do not expire password (true or false, indicating if the user password is set to expire or not), and an actions button (additional user details including group membership(s) for selected user).

The users tile 711 (an assessment tile) allows a deep dive into the configuration parameters for a specific user. Ethe users tile 711 is important to establish company compliance policies to identify inactive users, including a process to verify whether and when their accounts can be disabled to improve performance and security. Also, to ensure that sensitive accounts such as admins are set to "account is sensitive and cannot be delegated" when created. Clicking the users tile 711 Will display all users in Active Directory with the following details: user ID (email address), display name (name displayed for user which is typically different than an email address), domain (the domain in which the account exists), password last changed (date and time the password was last reset), account last login (date and time of last login), sensitive (true or false—this delegation ensures that a sensitive account's credentials (such as those for a domain admin) cannot be forwarded to other computers or services on the network by a trusted application), info collected on (timestamp for last time data was updated), and an actions button (additional user details including group membership(s) for selected user).

The domains tile 712 (an assessment tile) displays the total number of domains within Active Directory. Clicking the tile displays the following: domain name, machine account quota (number of computer accounts that a non-admin user is allowed to create in a domain), and functional level (determines the features of Active Directory domain services that are enabled in the domain (e.g. the year of the operating system running on the server such Windows Server 2016, as well as the Windows Server operating systems you can run on domain controllers in the domain or forest. However, functional levels do not affect which operating systems you can run on workstations and member servers that are joined to the domain or forest).

The sessions tile 713 (an assessment tile) displays the total count of active sessions. Clicking the tile displays a record of all sessions including the following: computer name (hostname), and user name (email address). This is an important tile because it shows any sensitive accounts such as admins who have logged into a machine not having used Logon Type 3; a network logon so that credentials are not stored in the Local Security Authority Subsystem Service (LSASS) or on the disk.

The groups tile 714 (an assessment tile) displays the total number of groups as well as the number of groups added or removed since the last agent run (typically every twenty-four hours). Clicking the tile displays the following: name (name of security group), domain (domain in which group exists), description (description of security group), info collected on (timestamp for last time data was updated), and an actions button (displays additional details including users with membership to the selected group).

The stale accounts tile 715 (a potential risk tile) displays the total number of user accounts that have not logged in for specified period of time (ninety days by default). Clicking the tile displays the following characteristics: user ID (email address), display name (name displayed for user which is typically different than an email address), account disabled (true or false), domain (the domain in which the account exists), password expired (true or false), password last changed (date and time the password was last reset), account last login (date and time of last login), Do not expire password (true or false, indicating if the user password is set to expire or not), and an actions button (additional user details including group membership(s) for selected user). This is important to establish and abide by company compliance policies to manage access for inactive accounts, including a process to verify whether and when they can be disabled to improve performance and security.

The computers tile 716 (an assessment tile) provides a quick view into all computers and their properties within a forest, including the ability to easily identify inactive computers. This tile is important to ensure no computers are running an OS that is either beyond end-of-life or otherwise doesn't meet compliance requirements, and establish company compliance policies to manage access to inactive computers, including a process to verify whether and when they can be removed from the network to improve performance and security. Clicking on the tile will display the following characteristics: name (device name), primary group (if the computer belongs to multiple groups, displays which group is primary), domain (domain(s) in which computer exists), operating system (designates OS version running currently), last log in (date and time of last successful logon to the computer), password last set (date and time of last password reset for the computer).

The non-admin able to join computer tile 717 (a potential risk tile) is important because the ability to add computers to the AD forest may create unwanted or unintended access points, and by default any user can add 10 computers to the domain. This tile will help to limit the ability to add computers to admins only if possible, or otherwise reduce as much as possible the number of computers that can be created by non-admins. This tile displays the total number of non-admin users that are able to add devices to the AD forest. Clicking the tile displays the following characteristics: user ID (email address), display name (name displayed for user), domain (domain in which account exists), computer quota (number of computers that can be created by this user), count of computers created (number of computers already created by this user), and an actions button (displays additional details including a list of Computers created by the selected user).

An access control entry (ACE) defines an access or audit permission on an object (such as read or write permissions) for a specific user or group. All users and groups should be given the strictest set of permissions possible without compromising the ability to perform required organizational functions. The access control entries tile 718 (an assessment tile) displays the total number of access control entries in the AD forest. An access control lists (ACL) and discretionary access control lists (DACL) are ordered collections of ACEs. Clicking the tile displays the following characteristics: entity name (name of entity or object for which ACEs are defined), entity type (type of entity (user, group, computer, or service) for which access is being requested), principal name (name of security principal (typically the requester of access to an object or service)), principal type (usually a user or group but could be a computer or service) and the right name (Such as those from FIG. 6 (e.g., ForceChangePassword, AddMembers, GenericAll, GenericWrite, WriteOwner, WriteDACL, and AllExtendedRights)).

An organizational unit (OU) is a container within a Microsoft Active Directory domain which can hold users, groups and computers. It is the smallest unit to which an administrator can assign group policy settings or account permissions, and thoughtful design of OU structure greatly improves administrative overhead. The organizational units tile 719 (an assessment tile) displays the total number of Organizational Units in the AD forest. Clicking the tile displays the following characteristics: name (name of organization), description (description of organization), and blocks inheritance (this setting determines whether a child OU automatically inherits the settings of its parent OU).

Domain Admins are the ultimate target of identity-based attacks and should therefore adhere to stricter policies for password resets. The no password expiry admin tile 720 (a potential risk tile) displays the total number of domain admins whose password is not set to expire automatically (poor hygiene). Clicking the tile displays the following characteristics: user ID (email address), display name (name displayed for user which is typically different than an email address), domain (the domain in which the account exists), password last changed (date and time the password was last reset), account last login (date and time of last login), sensitive (true or false—this delegation ensures that a sensitive account's credentials (such as those for a domain admin) cannot be forwarded to other computers or services on the network by a trusted application), info collected on (timestamp for last time data was updated), and an actions button (additional user details including group membership(s) for selected user).

Group Policy Objects (GPOs) are collections of group policy settings within the domain, such as organization-specific password requirements or installation restrictions. The group policy objects tile 721 (an assessment tile) displays the total number of GPOs. Clicking the tile displays the following characteristics: name (policy name), description (policy description), GPC Path (location of the Group Policy Container (GPC), which is the portion of a GPO stored in Active Directory that resides on each domain controller in the domain), and an actions button (displays additional details including a list of ACEs associated with the selected GPO).

The local admin account is disabled by default on all computers in all currently supported Windows versions and should remain disabled if possible because local admins have full administrative control over a given computer. Clicking the local admins tile 722 (a potential risk tile) displays hostname (device name), computer (true or false (as opposed to a user account)), admin name (admin username), type (account type (User or Group)), domain (domain in which local admin account exists), and timestamp (account creation date and time). The main tile displays tile displays the total number of local admin accounts configured in the Active Directory forest.

Null Sessions are anonymous connections intended to support named pipe connections, but they are common threat vectors for attackers to gather system information remotely. The null session enabled computers tile 723 (a potential risk tile) displays the total number of computers with Null Session enabled in the Active Directory forest. Clicking the tile displays the following details: name (device name), primary group (if the computer belongs to multiple groups, displays which group is primary), domain (domain(s) in which computer exists), operating system (designates OS version running currently), last log in (date and time of last successful logon to the computer), password last set (date and time of last password reset for the computer).

Trusts provide a critical role in easing management of accessibility across domains, but creating trusts from one forest or domain to another extends the authentication boundary as well as potentially exposing information unintentionally. The trusts tile 724 (an assessment tile) displays total number of trusts in the Active Directory forest. Clicking the tile displays the following trust parameters: domain name (name of domain for which trust is defined), is transitive (true or false, based on whether or not this is a two-way relationship between a child and parent domain that is established automatically when a new domain is configured), target name (name of target domain with which trust is established), trust direction (can be one-way or bidirectional), and trust type (external—used if resources are located in a different AD forest, realm—used between an AD forest and a non-Windows Kerberos directory such as Unix, forest—used to share resources between AD forest, and shortcut—may be used to improve the user login experience across domains).

Other tiles not shown here may include a Kerberos tile highlighting information about the built-in KRBTGT account. The password hash of the KRBTGT account is used by the Kerberos Authentication Service (AS) contained within the Key Distribution Center (KDC) service to encrypt and sign all Kerberos tickets within a domain. In the event of a compromise, this account is a common target because anyone can forge Kerberos TGTs (called Golden Tickets) if they have the KRBTGT password hash, for as long as the KRBTGT account's password remains the same. Golden Tickets can give attackers Domain Administrator privileges, with full access to any Kerberos service in the domain. Like any privileged service account, organizations should change this password on a regular basis (recommended monthly by Microsoft). Resetting the password also ensures that a newly restored domain controller does not replicate with a compromised domain controller. The Kerberos tile displays the total number of KRBTGT Accounts in the Active Directory forest. Clicking the tile displays the following, with 'password last set' being of particular importance in this case: user ID (name of account (agent ID)), primary group (designates group to which agent service is assigned), password last set (date and time of last password reset), and an actions button (additional user details including group membership (s) for selected user).

Another tile may be a user memberships tile. This utilizes a CPG and is particularly useful in understanding the potential impact if a given user's credentials are compromised by identifying all group memberships associated with the selected user. Clicking the tile displays all users in Active Directory with the following details: domain (domain in which user exists), user ID (email address), display name (name displayed for user), password last changed (date and time of last password reset), account last login (date and time of last login), group name (name of security group), and an actions button (additional user details including group membership(s) for selected user). Tiles such as this one are prime examples of tiles in which clicking this tile reveals links for professionals to view the CPG and make additional queries such as A-star search queries or others.

Tiles that use or display the cyber-physical graph may employ a set of predefined queries useful to most IT professionals. These default queries include: find all domain admins, find shortest paths to domain admins, find principals with DCSync rights, users with foreign domain group membership, groups with foreign domain group membership, map domain trusts, shortest paths to unconstrained delegations systems, shortest paths from Kerberoastable users, shortest paths to domain admins from Kerberoastable users, shortest paths from owned principals, shortest paths to domain admins from owned principals, and shortest paths to high value targets.

It is important to reiterate that this information, typically in varying and incompatible formats is spread throughout Active Directory can now be found in one place, is also now time-series data providing historical feedback (as graphs, especially histograms), and is expertly curated increasing Active Directory defenses.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
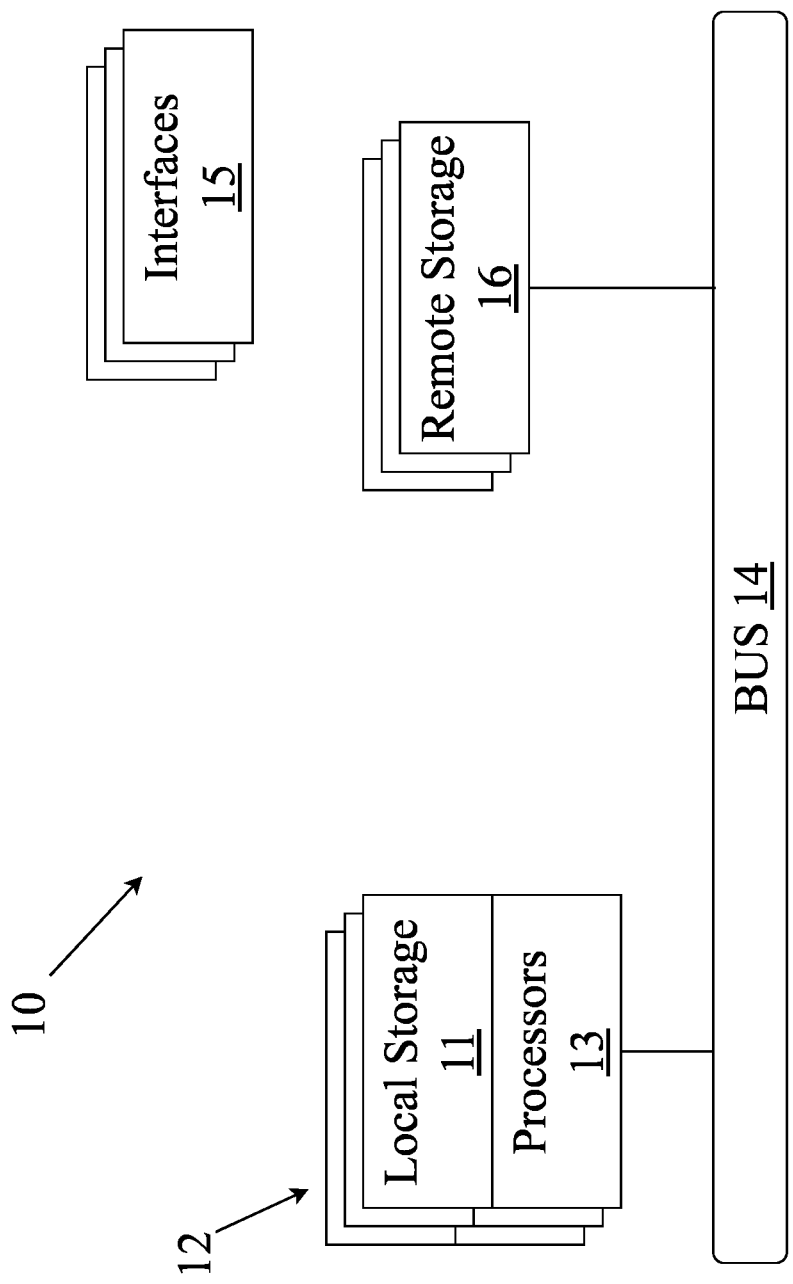
FIG. 8 is a block diagram illustrating an exemplary hardware architecture of a computing device used in various embodiments of the invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
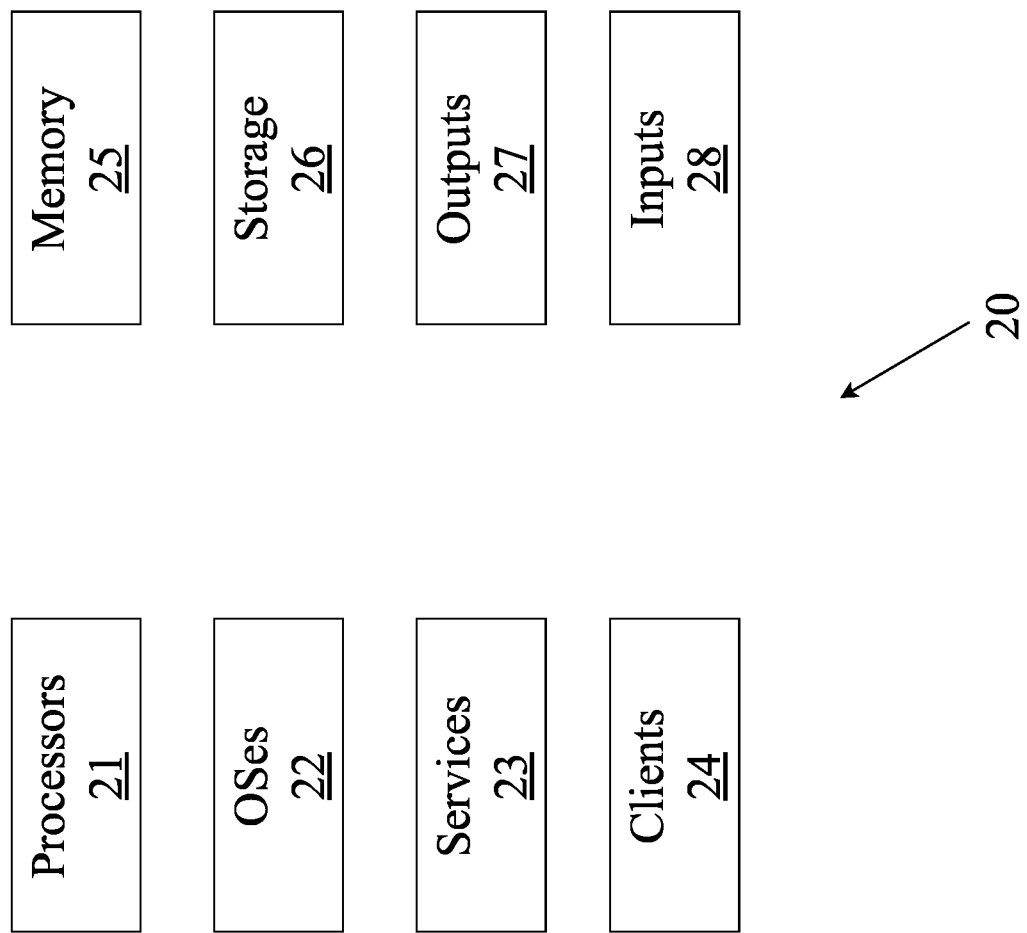
FIG. 9 is a block diagram illustrating an exemplary logical architecture for a client device, according to various embodiments of the invention.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
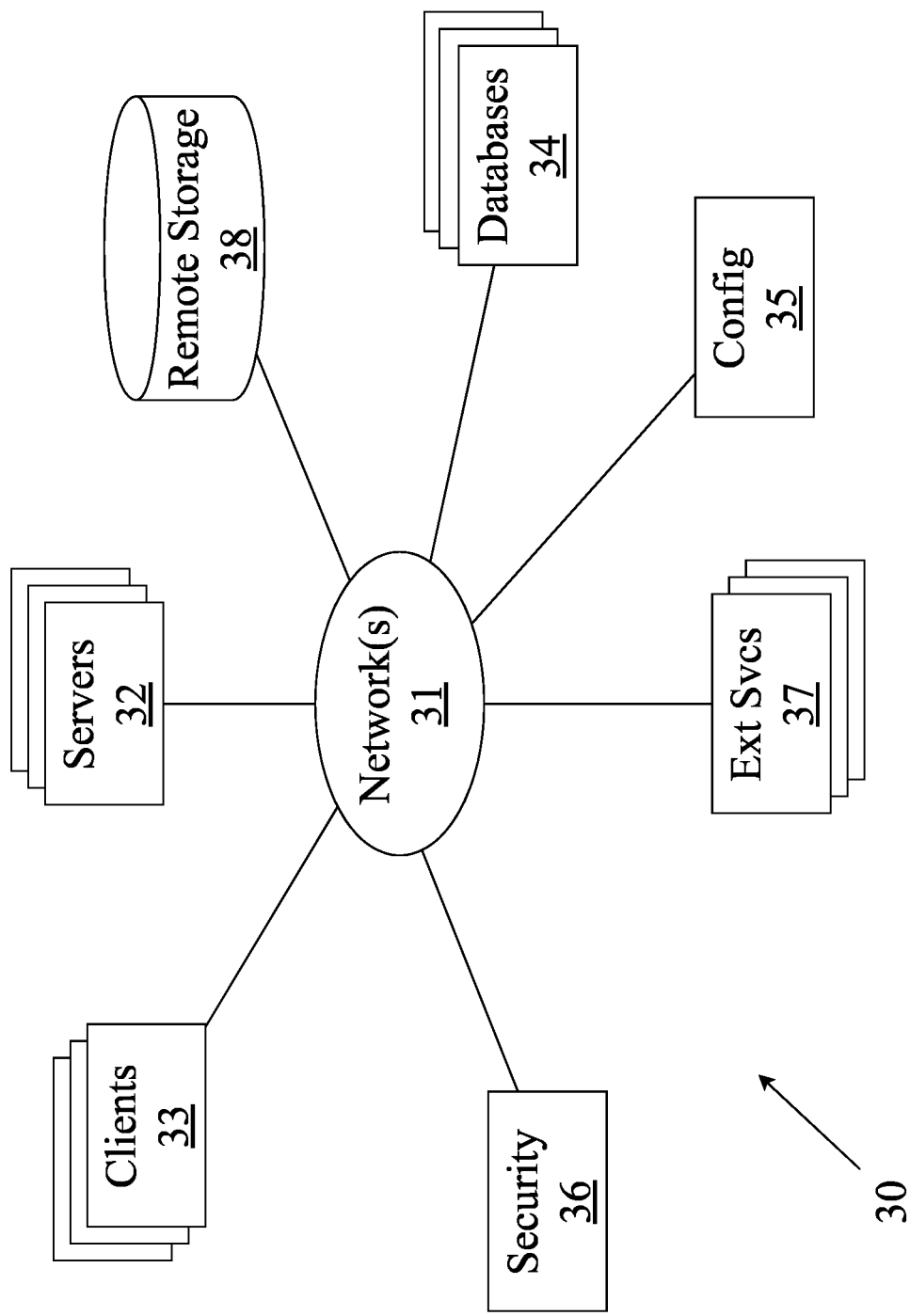
FIG. 10 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
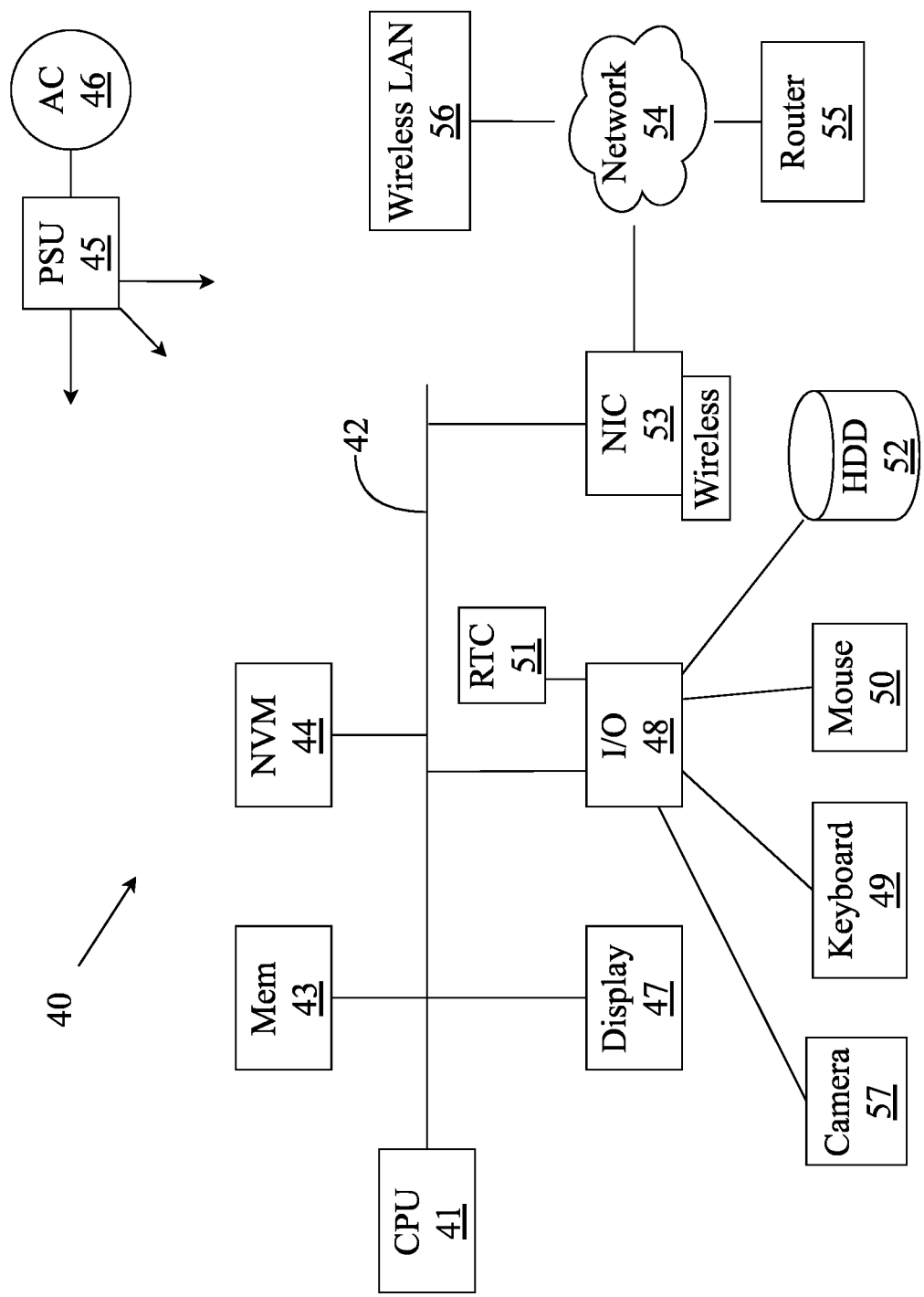
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for prevention, mitigation, and detection of cyberattack attacks on computer networks using logon session tracking and logging, comprising:
a local session monitor comprising a first plurality of programming instructions stored in a memory of, and operating on a processor of, a first computing device within a computer network operating a directory access protocol, wherein the first plurality of programming instructions, when operating on the processor of the first computing device, cause the first computing device to:
receive a first plurality of session-based details for an authentication session for a user;
check the validity of the first plurality of session-based details, using a stored session configuration;
log the first plurality of session-based details; receive a second plurality of session details;
compare the first and second pluralities of session details to identify any mismatched data;
where invalid or mismatched information is identified in the first or second pluralities of session-based details, generate an event log indicating the particular session-based details that contain the invalid or mismatched information;
send the event log to a graph engine;
a graph engine comprising a second plurality of programming instructions stored in a memory of, and operating on a processor of, a second computing device, wherein the second plurality of programming instructions, when operating on the processor of the second computing device, cause the second computing device to:
receive the event log;
create and store a cyber-physical graph of the computer network using the event log, wherein the vertices of the cyber-physical graph represent directory access protocol objects and the edges of the cyber-physical graph represent the relationships between those objects;
perform a plurality of queries over time on the cyber-physical graph about a cyberattack parameter of interest;
receive results of the plurality of queries; and
send the results to a time-series rule comparator;
a time-series rule comparator comprising a third plurality of programming instructions stored in a memory of, and operating on a processor of, a third computing device, wherein the third plurality of programming instructions, when operating on the processor, cause the third computing device to:
receive the results from the graph engine;
measure changes over time in the results;

if the measurement of the changes over time exceeds a threshold, send the results to a user interface; and a user interface comprising a fourth plurality of programming instructions stored in a memory of, and operating on a processor of, a fourth computing device, wherein the fourth plurality of programming instructions, when operating on the processor, cause the fourth computing device to:

receive the results;

identify the directory access protocol objects and relationships which caused the measurement of changes to exceed the threshold; and display a portion of the cyber-physical graph comprising the vertices and edges corresponding to the identified directory access protocol objects and relationships.

2. The system of claim 1, wherein the first plurality of session-based details comprises a session expiration timing information.

3. The system of claim 2, wherein the invalid information comprises invalid expiration timing information.

4. The system of claim 1, wherein the first plurality of session-based details comprises a user name.

5. The system of claim 4, wherein the mismatched information comprises a user name that does not correspond to the user of the authentication session.

6. A method for prevention, mitigation, and detection of cyberattack attacks on computer networks using logon session tracking and logging, comprising the steps of:

collecting, at a local session monitor, a first plurality of session-based details for an authentication session for a user;

checking the validity of the first plurality of session-based details, using a stored session configuration;

logging the first plurality of session-based details;

receiving a second plurality of session details;

comparing the first and second pluralities of session details to identify any mismatched data;

where invalid or mismatched information is identified in the first or second pluralities of session-based details, generating an event log indicating the particular session-based details that contain the invalid or mismatched information;

sending the event log to a graph engine;

creating and storing a cyber-physical graph of the computer network using the event log, wherein the vertices of the cyber-physical graph represent directory access protocol objects and the edges of the cyber-physical graph represent the relationships between those objects;

performing a plurality of queries over time on the cyber-physical graph about a cyberattack parameter of interest;

receiving results of the plurality of queries;

measure changes over time in the results;

if the measurement of the changes over time exceeds a threshold, sending the results to a user interface;

identifying the directory access protocol objects and relationships which caused the measurement of changes to exceed the threshold; and displaying, on the user interface, a portion of the cyber-physical graph comprising the vertices and edges corresponding to the identified directory access protocol objects and relationships.

7. The method of claim 6, wherein the first plurality of session-based details comprises a session expiration timing information.

8. The method of claim 7, wherein the invalid information comprises invalid expiration timing information.

9. The method of claim 6, wherein the first plurality of session-based details comprises a user name.

10. The method of claim 9, wherein the mismatched information comprises a user name that does not correspond to the user of the authentication session.

\* \* \* \* \*